United States Patent
Singh et al.

(10) Patent No.: US 11,628,698 B2
(45) Date of Patent: Apr. 18, 2023

(54) HITCH VIBRATION DAMPENER

(71) Applicant: Advanced Engineering Group, LLC, Valencia, CA (US)

(72) Inventors: Arvinder Singh, Valencia, CA (US); Hardeep Singh, Valencia, CA (US)

(73) Assignee: Advanced Engineering Group, LLC, Valencia, CA (US)

( * ) Notice: Subject to any disclaimer, the term of this patent is extended or adjusted under 35 U.S.C. 154(b) by 399 days.

(21) Appl. No.: 16/518,471

(22) Filed: Jul. 22, 2019

(65) Prior Publication Data
US 2020/0031185 A1 Jan. 30, 2020

Related U.S. Application Data

(60) Provisional application No. 62/711,771, filed on Jul. 30, 2018.

(51) Int. Cl.
*B60D 1/24* (2006.01)
*B60D 1/50* (2006.01)

(52) U.S. Cl.
CPC .............. *B60D 1/249* (2013.01); *B60D 1/50* (2013.01)

(58) Field of Classification Search
CPC ... B60D 1/06; B60D 1/46; B60D 1/50; B60D 1/241; B60D 1/249
USPC ....................................................... 280/504
See application file for complete search history.

(56) References Cited

U.S. PATENT DOCUMENTS

| | | | | |
|---|---|---|---|---|
| 4,773,668 A * | 9/1988 | Muonro | .................. | B60D 1/50 280/487 |
| 6,089,431 A * | 7/2000 | Heyworth | .............. | B60D 1/075 224/521 |
| 6,237,824 B1 * | 5/2001 | Bagley | ...................... | B60R 9/06 224/402 |
| 6,361,264 B1 * | 3/2002 | Guthrie | .................. | B60R 9/065 224/521 |
| 6,581,953 B2 * | 6/2003 | Jerry | ........................ | B60D 1/52 D12/162 |
| 6,834,879 B1 * | 12/2004 | Lorman | .................. | B60D 1/06 280/483 |

(Continued)

FOREIGN PATENT DOCUMENTS

| | | | | |
|---|---|---|---|---|
| CA | 2955509 A1 * | 6/2018 | .............. | B60D 1/58 |
| CN | 102131137 A * | 7/2011 | .......... | H04R 1/2819 |

OTHER PUBLICATIONS

CURT Manufacturing, Adjustable Channel Mount with Dual Ball (2" SHANK, 14,000 lbs., 6" DROP) #45900, https://www.youtube.com/watch?v=o_NrEytmark, first posted Jan. 3, 2018, 1 page (Instruction manual 2 pages) (Year: 2018).*

*Primary Examiner* — Minnah L Seoh
*Assistant Examiner* — Felicia L. Brittman
(74) *Attorney, Agent, or Firm* — Apex Juris, PLLC; Tracy Heims; R Wylie

(57) ABSTRACT

A hitch vibration dampener assembly and method of use thereof including a tow mount member including a base portion with a vibration dampener pad affixed to the back surface such that coupling of the tow mount member by locked engagement of at least one elongated pin successively received through paired side holes disposed in flanges of a hitch platform channel compresses vibration dampener pad upon the back panel of the hitch platform to thereby reduce the movement between the tow mount member and hitch assembly.

19 Claims, 3 Drawing Sheets

(56) References Cited

U.S. PATENT DOCUMENTS

| | | | |
|---|---|---|---|
| 8,366,373 B2* | 2/2013 | Wood | B60P 1/5471 |
| | | | 414/543 |
| 2004/0060200 A1* | 4/2004 | Schmeichel | E01H 5/061 |
| | | | 37/231 |
| 2006/0255561 A1* | 11/2006 | Tambornino | B60D 1/00 |
| | | | 280/491.5 |
| 2012/0119467 A1* | 5/2012 | Svihla | B60D 1/46 |
| | | | 280/477 |
| 2018/0265007 A1* | 9/2018 | Good | B60R 3/007 |
| 2018/0281536 A1* | 10/2018 | Harper | B60D 1/06 |

* cited by examiner

HITCH VIBRATION DAMPENER

CROSS-REFERENCE TO RELATED APPLICATIONS

This application claims priority to and benefit under 35 USC § 119(e) of U.S. Provisional Patent Application Ser. No. 62/711,771 having a filing date of Jul. 30, 2018, which is hereby incorporated by reference herein.

FIELD OF THE INVENTION

This invention relates to the field of dampening and thereby reducing the relative movement and rattling between a tow accessory base and hitch receiver.

BACKGROUND OF THE INVENTION

Many vehicles today are equipped with receiver-type trailer hitches. These types of trailer hitches typically are a square tube, normally 1¼" or 2" internal height and width, attached to the undercarriage of the vehicle. A second tube acts as a shank and includes outer dimensions slightly smaller than the internal dimensions of the receiver tube and is slidable within the receiver tube. The shank member is connected to the receiver tube by a secured pin inserted through the two tubes.

The shank member may include a standard single or dual ball-mount for engaging with the hitch of a trailer or other wheeled vehicle. Another popular use for receiver hitches is the use as a coupling device for installing equipment racks, ski carriers, storage boxes and other types of carriers have been designed to use the above-described second tube to engage within a receiver hitch tube. This provides a universal system that allows a vehicle user to be able to use various trailer and carriers with a single coupling system.

A particular problem with the use of these receiver coupling systems is play between the receiver hitch platforms and hitch ball or direct tow accessory assemblies. The base of the tow mount or accessory tends to rattle or chatter within the channel of the hitch platform. This rattle or chatter is at best an annoyance and at worst can distract the driver or cause damage to the trailer or the carrier.

There have been a number of attempts to solve this problem in the past. Such attempts typically required the use of specially designed receivers, shanks, or mechanisms that typically adapt size and fasteners to stabilize junctures between hitch assemblies.

One such prior art hitch assembly addressing the latter problems is shown in the prior art height adjustable dual hitch ball flange platform assembly shown, described and claimed in U.S. Pat. No. 8,033,563. The latter patented hitch assembly employs two locking pins on an upper and lower section of the dual hitch ball base inserted through corresponding holes in the double flanges to secure and stabilize the hitch ball base at an appropriate height within a vertical channel formed between two outwardly extending flanges.

Although the latter dual pin mount provided the substantial improvements of reduced play, rattling and pivoting of the hitch assembly relative to the vehicle, movement and vibration due to loosening and play between the tow accessory member and hitch receiver platform persists. The movement and noise is exacerbated if the tow accessory is installed on an upper or lower section of the channel and thus not evenly supported along the base of the tow accessory. Such eccentric positioning of the hitch ball along the hitch platform channel and resulting movement causes vibrations and gyrating movement. In extreme driving terrain or weather conditions, even hazardous swaying of the vehicle may result.

Prior art devices further include inserting a rubber device into apertures of a universal tow platform, which preferably fills three apertures adjacent to opposing sides and rear surface or the hitch accessory to snugly secure the hitch ball and thereby dampen movement and rattling. However, since the rubber device is installed in the hitch platform, the hitch ball may not align the rubber device in all position, particularly if used with a dual flange ball that is installed on the uppermost or lowermost portion of the platform.

Although the latter device provided an improvement over prior art hitch assemblies and reduced rocking, swaying and pivoting of the hitch assembly relative to the vehicle, issues arising from loose rattling between the tow accessory member and hitch receiver platform persists. As is readily surmised from consideration of impacts and resulting external forces exerted upon a vehicle and any towed accessory will shake and exert commensurate stress loosening abutting rigid metal surfaces of the hitch assembly and will resonate toward edges of the hitch ball base and platform, resulting in rattling and possible swaying of the vehicle.

Such vibration, noise and directional interference with safely steering the car may be exacerbated if the hitch ball or tow accessory are not tightly compressed along the channel of the platform. This is particularly problematic if the hitch ball mount tow accessory is installed on an uppermost or lowermost end of the channel where the entire length of the hitch ball mount base is not supported along the channel of the tow accessory, which is a particularly prevalent issue associated with dual flange ball. When in upper and lower mounted positions, the base may extend beyond the channel and flanges support exacerbating movement causing rattling and vibrations and may even cause veering, swaying, gyrating and even dangerous pivoting to one side or another of the vehicle that is difficult. This rattle or chatter is at best an annoyance and at worst can distract the driver or cause damage to the vehicle or tow accessory. In extreme driving terrain or weather condition, the swaying or pivoting of the vehicle may be impossible to control.

There have been a number of attempts to solve this problem in the past. These attempts typically required the use of specially designed receivers, shanks, or accessories in order to reduce the vibration, play, rattle and even sway of the vehicle relative to the hitch assembly, and do not adequately address the play and rattle between hitch platform and base of the hitch ball member. Hence, there persists a need for a device that will minimize the play between the hitch assembly platform and base of the hitch ball member and associated noise, vibration and sway.

SUMMARY OF THE INVENTION

Addressing such and other drawbacks, the present invention relates to a hitch vibration dampener assembly for mounting between a base of a tow accessory such as a hitch ball and a hitch receiver platform. The present hitch vibration dampener assembly absorbs and attenuates impacts exerted from the movement of a vehicle and tow accessory, dissipates the exerted force at the tow mount base and hitch platform junction, thereby reducing associated play movement, vibration and resulting rattling and swaying.

The hitch vibration dampener assembly of this invention reduces movement between a hitch platform and a tow mount member. In various embodiments such as described and claimed herein, the hitch platform has a shank tube portion configured for telescoped engagement within a receiver tube attached to a vehicle and a channel portion including an inner back plane of a recessed column perpendicularly disposed between opposed flanges with side holes spaced in corresponding paired alignment. The tow mount member has a rear portion in the form of a base integrally extended from a distal portion that includes a receiving end of tow mount for detachable hitching of an independent tow accessory. The rear portion has a planar back surface whereon at least one vibration dampener pad is affixed and at least one through hole disposed in parallel alignment with the planar back surface. An exemplary embodiment includes two through holes configured for aligned correspondence with the paired side holes. At least one elongated pin is configured for coupling of the through hole of the base portion between the side holes of the shank member such that engagement of the elongated pin with the paired side holes of the opposed flanges of the channel portion of the hitch platform and the through hole compresses the vibration dampener pad upon the recessed column of the channel portion.

The vibration dampener pad according to the present invention may be composed of an elastomer or any pliable or flexible material capable of absorbing impacts, vibration and attenuating movement between abutting and adjacent surfaces of a receiver ball or other tow accessory and a hitch receiver. One exemplary embodiment of the present invention includes a rubber or elastomer pad embedded insertable on universal hitch ball mount or other tow accessory further described and illustrated herein. A particularly preferred embodiment includes rubber vibration dampener pad affixed onto the back surface of a base of a dual flange ball mount tow mount. By thus affixing the vibration dampener pad to the planar back surface of the rear portion of the tow mount member, the anti-rattle dampener engages with the hitch platform and therefore is deployed in all positions regardless of height adjustments thereto.

A representative embodiment of this vibration dampener device particularly suitable for after-market applications includes a combination of rubber and metal screw thread configured to engage a corresponding threaded hole the back surface of the tow hitch mount member rear portion or base.

As used herein, "tow mount member" refers to a single, dual or any hitch ball mount or other hitch receiver mount for coupling of an independent tow or towed accessory, including, without limitation, a trailer, carrier such as for bicycles or recreational equipment racks, ski carriers, storage decks, boxes, cages or bags, and other types of carriers mountable to a tow hitch assembly coupled within a receiver tube attached to a vehicle.

These and other features will be evident from the ensuing detailed descriptions of representative exemplary embodiment below and from the drawings.

DETAILED DESCRIPTION OF PREFERRED EMBODIMENTS

Figure 1:
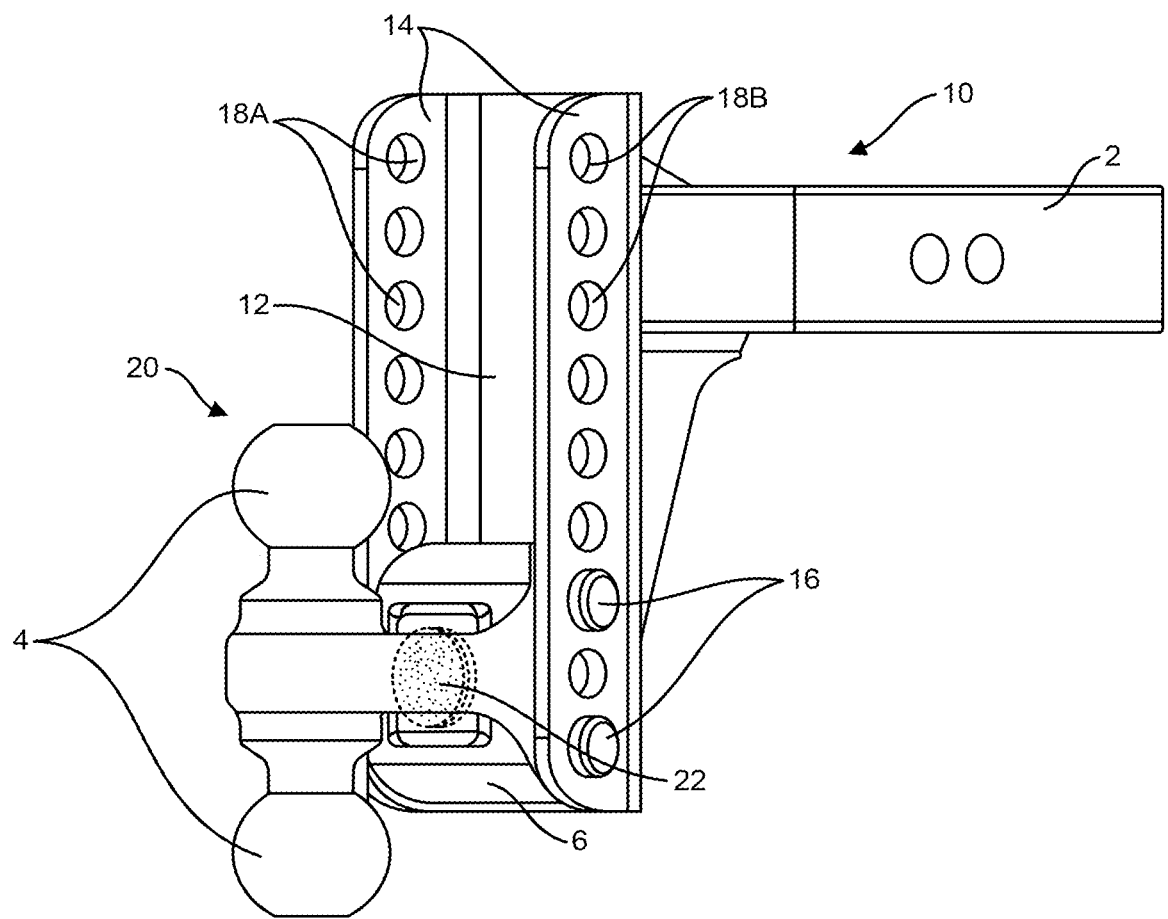
FIG. 1 is a side perspective view of an exemplary embodiment of the hitch vibration dampener assembly of the present invention attached to a receiver tube.
Figure 2:
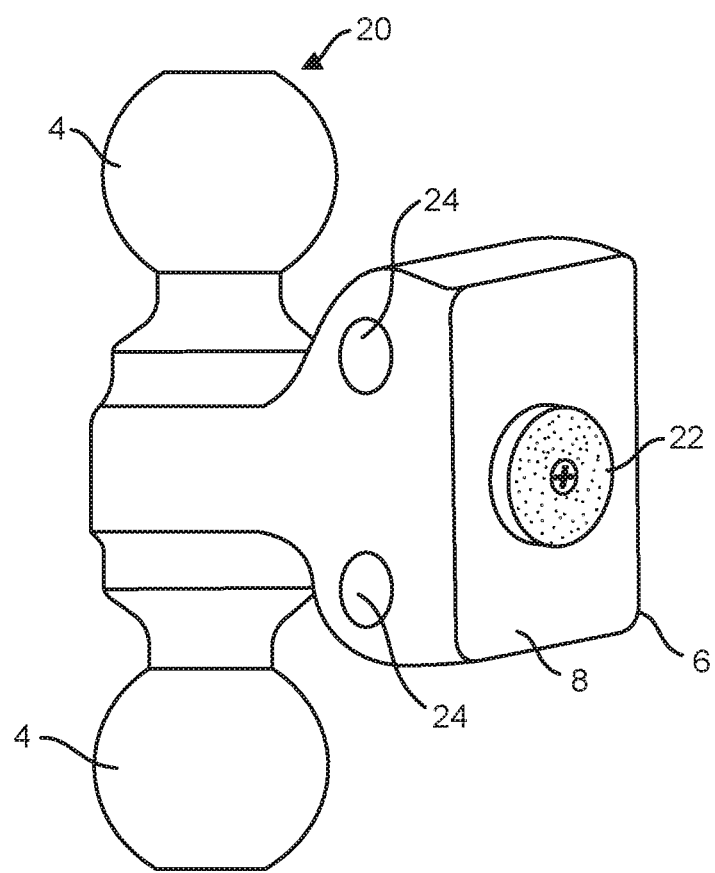
FIG. 2 is a side perspective view of the exemplary dual hitch ball hitch ball vibration dampener assembly employing a hitch vibration dampener pad shown in FIG. 1.
Figure 3:
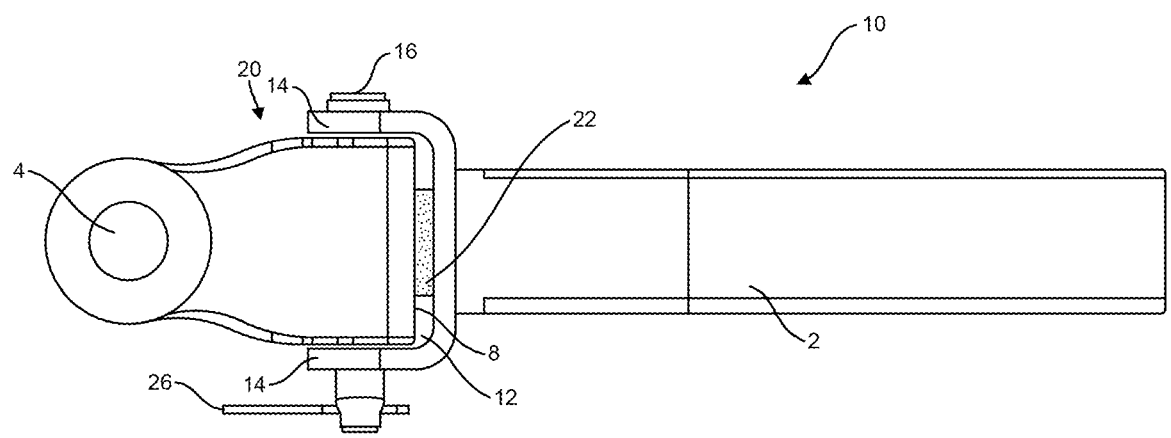
FIG. 3 is a top perspective view of the exemplary hitch vibration dampener assembly illustrated in FIGS. 1 and 2.

An exemplary embodiment of the present invention illustrated in FIGS. 1-3 includes a vibration dampener pad 22 affixed directly to a planar back surface 8 of a rear portion 6 of a dual flange ball tow mount member 20.

It is to be expressly understood that the illustrative embodiment is a representation of the invention for explanatory purposes only and is not meant to unduly limit the claimed invention. The representative embodiment of the present invention is intended for use with receiver hitch systems including trailer mounts but also includes other two hitch mount members such as detailed below. The illustrated as well as alternative embodiments may be used for original equipment installations and as an after-market accessory.

In the exemplary embodiment shown in FIGS. 1-3, a shank tube hitch platform 10 is attachable within a corresponding receiver tube mounted beneath a bumper of a vehicle by well-known mounting techniques, such as by bolting or welding (not shown). In the illustrated embodiment a platform shank tube 2 is sized and configured for telescoped seating within a 1½ inch square or 2-inch square receiver tube (internal dimensions). As is readily apparent, the hitch vibration dampener of the present invention may be employed with other sizes of shapes of hitch receiver tubes. In the exemplary embodiment described herein, tow mount member 20 is illustrated as a trailer dual hitch ball mount. However, the claimed invention also includes tow mount members having single hitch ball, step mounts or any carrier mounted thereon, such as bicycle carriers, ski carriers, cargo compartments, platforms and other types of receiver mounted devices.

Still referring to FIGS. 1-3, tow hitch platform 10 is detachably securable to a tow mount member 20. Tow mount member 20 includes distal portion with a receiving end configured as dual hitch receiver ball mounts 4. A rear portion 6 of tow mount member 20 integrally extended from the distal portion is sized and configured for aligned abutment within a channel portion of recessed column 12 of universal hitch platform 10. The rear portion 6 includes includes a planar back surface 8 and two through holes 24 configured for aligned coupled engagement with corresponding paired side holes 18A and 18B. Elongated pins 16 are successively received through first side holes 18A, through holes 24 and corresponding second side holes 18B to couple the rear portion 6 within recessed column 12 of the channel portion formed between opposing dual flanges 14 and thereby engages planar back surface 8 such that securing elongated pins 16 couples tow hitch member 20 into locked engagement. and thereby compresses the vibration dampener pad 22 upon a corresponding portion of recessed column 12 between opposing dual flanges 14. Subsequent insertion of locking clips 26 through holes on ends of elongated pins 16 further secures tow mount member 20 into locked engagement with hitch platform 10.

Now referring to FIGS. 1 and 2, hitch vibration dampener pad 22 according to the present invention is shown as circular in shape and measures about 1½ inches in diameter. FIG. 1 illustrates vibration dampener pad 22 in dashed lines as a concealed component. Alternative configurations of the pad dimensions may vary in accordance with the use and dimensions of the respective platform, tow accessory and vehicle in connection with which it is being deployed.

The composition of the hitch vibration dampener pad 22 is preferably a polymeric rubber material. However, the body of hitch vibration dampener pad 22 may be composed of any elastomer, or pliable, impact or vibration-absorbing material of suitable density, flex, and durability and is functionally adaptable to dampen, buffer, dissipate or attenuate, a vibration, impact, shock, stress, strain or torque exerted by an external force. The impact absorbing or dampening composition of vibration dampener pad 22 is configurable in any suitable size and shape such as, for example, a curved or circular device, bumper, washer, block, sheet, sleeve or other form that is adaptable to the geometry of the tow hitch platform and tow mount member.

Hitch vibration dampener pad 22 may be affixed by a single metal screw as shown in FIG. 2 or multiple screws, or alternatively be fused or adhered to the back of the dual ball base with an industrial strength epoxy, or utilizing other means or materials well known in the art.

Moreover, the shape of the hitch vibration dampener pad of the present invention can take on various configurations which may include linear, curvilinear, convex or concave portions. The scope of the present invention expressly contemplates and includes any shape as well as composition providing the impact and vibration absorbing or attenuation, the extent of which may correspond to the hitch vibration dampener pad composition's mechanical properties, including without limitation, vibration and impact absorption capacity, pliability, tensile strength and density.

As will be apparent to persons of ordinary skill in the art of tow hitch assembly design and engineering, the extent and impact receiving and attenuation capacity of the device of the present invention correlates to the dampener surface area, thickness and density. More specifically, the vibration dampener pad 22 surface area, thickness and density comports with the connection tension of the hitch vibration dampening assembly exerted which is a function of the weight, shape and size, aerodynamics as well as force and torque exerted on the tow hitch assembly when in use.

It is to be expressly understood that the descriptive embodiment is provided herein for explanatory purposes only and is not meant to unduly limit the claimed inventions. The preferred embodiment of the present invention is intended for use with receiver hitch systems including trailer mounts as well as carriers. The preferred embodiment may be used for original equipment installations and as an after-market item.

Hence, it is to be further expressly understood that these exemplary embodiments are provided for descriptive purposes only and not meant to unduly limit the scope of the claimed inventions. Other embodiments are also considered to be within the scope of the present inventions.

The invention claimed is:

1. A hitch vibration dampener assembly, comprising:
   a hitch platform having
      a shank tube portion configured for telescoped engagement within a receiver tube attached to a vehicle,
      a channel portion including a recessed column perpendicularly disposed between opposed flanges,
      a plurality of side holes disposed in the opposed flanges wherein the side holes are disposed to form aligned pairs;
   a tow mount member having a distal portion configured with an integral receiver end for detachable hitch mounting of a towed accessory, and
      a rear portion having a planar back surface integrally extending from the distal portion of the tow mount member, wherein the rear portion is configured for aligned abutment within the channel portion of the hitch platform, and wherein there is at least one through hole in the rear portion configured for aligned correspondence with the aligned pairs of side holes disposed in the opposed flanges;
   a vibration dampener pad affixed in abutted alignment to the planar back surface of the rear portion such that the vibration dampener pad stays fixed to the planar back surface when not in aligned abutment within the channel portion of the hitch platform and wherein the vibration dampener pad moves in tandem with the tow mount member; and
   at least one elongated pin configured for coupling the through hole of the rear portion and the aligned pair of side holes such that locked engagement of the at least one elongated pin with the aligned pair of the side holes secures the planar back surface of the rear portion of the tow mount member to thereby compress the vibration dampener pad upon the recessed column of the channel portion of the hitch platform to thereby dampen frictional noise due to contact between the hitch platform and the tow mount member.

2. The hitch vibration dampener assembly of claim 1, wherein the vibration dampener pad includes a rubber material.

3. The hitch vibration dampener assembly of claim 1, wherein the vibration dampener pad includes an elastomer material.

4. The hitch vibration dampener assembly of claim 3, wherein the vibration dampener pad has an outer perimeter having a circular or curvilinear configuration.

5. The hitch vibration dampener assembly of claim 1, further comprising a metal screw for affixing the vibration dampener pad to the rear portion of the tow mount member.

6. The hitch vibration dampener assembly of claim 1, wherein the vibration dampener pad is fused to the rear portion of the tow mount member.

7. The hitch vibration dampener assembly of claim 1, wherein the at least one elongated pin has a clip hole proximate to a throughput end and further comprising a locking clip wherein securing the locking clip into the dip hole when the at least one elongated pin is coupled with the aligned pair of side holes and the corresponding through hole of the rear portion securely engages the hitch platform and the tow mount member.

8. The hitch vibration dampener assembly of claim 1, wherein the at least one through hole comprises two through holes spaced apart for aligned coupled engagement with a corresponding aligned pair of the plurality of side holes and the vibration dampener pad is centered along a transverse plane at a mid-point between the two through holes, and wherein the at least one elongated pin comprises two elongated pins and each of the two elongated pins has a clip hole proximate to a throughput end and further comprising two locking clips wherein securing the two locking clips into the clip holes when the two elongated pins are coupled with the aligned pair of side holes and the corresponding two through holes of the rear portion securely locks the hitch platform and the tow mount member.

9. The hitch vibration dampener assembly of claim 8, wherein the vibration dampener pad includes a rubber material.

10. The hitch vibration dampener assembly of claim 8, wherein the vibration dampener pad includes an elastomer material.

11. The hitch vibration dampener assembly of claim 8, wherein the vibration dampener pad has an outer perimeter having a circular or curvilinear configuration.

12. The hitch vibration dampener assembly of claim 8, further comprising a metal screw for affixing the vibration dampener pad to the rear portion of the tow mount member.

13. The hitch vibration dampener assembly of claim 8, wherein the vibration dampener pad is fused to the rear portion of the tow mount member.

14. The hitch vibration dampener assembly of claim 8, wherein the vibration dampener pad is adhered to the rear portion of the tow mount member.

15. A hitch vibration dampener assembly, wherein a tow mount member comprises:
- a distal portion configured with an integral receiver end for detachable coupling of a towed accessory and a rear portion integrally extending from the distal portion wherein the rear portion has a planar back surface and at least one through hole disposed in parallel alignment to the planar back surface of the rear portion, and wherein the rear portion is configured for aligned abutment within a channel portion of a hitch platform; and
- a vibration dampener pad affixed in abutted alignment to the planar back surface of the rear portion such that the vibration dampener pad moves in tandem with the tow mount member, wherein the vibration dampener pad stays fixed to the planar back surface of the tow mount member when not in aligned abutment within the channel portion of the hitch platform,
- wherein coupled engagement of an elongate pin with the at least one through hole of the tow mount member secures the planar back surface of the rear portion of the tow mount member to thereby compress the vibration dampener pad upon the recessed column of the channel portion of the hitch platform to thereby dampen frictional noise due to contact between the hitch platform and the tow mount member.

16. A method for dampening frictional noise due to contact between the hitch platform and the tow mount, comprising the steps of:
- providing a hitch platform having a shank tube portion configured for telescoped engagement within a receiver tube attached to a vehicle and a channel portion including a recessed column perpendicularly disposed between opposed flanges, wherein a plurality of aligned pairs of side holes are disposed in the opposed flanges;
- providing a tow mount member having a distal portion configured with an integral receiver end for detachable hitching of an independent tow accessory and an rear portion integrally extending from the distal portion, wherein the rear portion has a planar back surface and at least one through hole, wherein the rear portion is configured for aligned abutment within a channel portion of a hitch platform, and at least one elongated pin dimensioned for detachable coupling of the aligned pairs of side holes and the through hole of the rear portion of the tow mount member;
- affixing a vibration dampener pad in abutted alignment to the planar back surface of the rear portion such that the vibration dampener pad moves in tandem with the tow mount member, wherein the vibration dampener pad stays fixed to the planar back surface of the tow mount member when not in aligned abutment within the channel portion of the hitch platform;
- installing the tow mount member such that the rear portion is disposed within the opposed flanges of the channel portion;
- aligning the at least one through hole of the base portion with the pair of aligned side holes in the opposed flanges of the channel portion such that the rear portion of the tow mount member including the vibration dampener pad is in abutted alignment with the recessed column of the channel portion; and
- inserting the elongated pin through the aligned pair of side holes of the channel portion and the through hole of the rear portion of the tow mount member such that locked engagement of the elongated pin with the aligned pairs of side holes compresses the vibration dampener pad upon the recessed column of the channel portion.

17. The hitch vibration dampener assembly of claim 1, wherein the integral receiver end is at least one hitch receiver ball for coupling a towed accessory.

18. The hitch vibration dampener assembly of claim 17, wherein the at least one hitch receiver ball are two hitch receiver balls of differing dimensions.

19. The hitch vibration dampener assembly of claim 18, wherein the two hitch receiver balls are outwardly disposed in opposed parallel alignment such that the elongated pin is capable of detachably coupling the at least one through hole of the tow mount with the aligned pair of side holes of the channel member so as to selectively position the two hitch balls for coupling with a towed accessory.

* * * * *